(12) United States Patent
Snyder et al.

(10) Patent No.: US 11,872,873 B2
(45) Date of Patent: Jan. 16, 2024

(54) VEHICLE DOOR ASSEMBLY

(71) Applicant: NISSAN NORTH AMERICA, INC., Franklin, TN (US)

(72) Inventors: David Snyder, Southfield, MI (US); Christopher Herrala, Milford, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/829,273

(22) Filed: May 31, 2022

(65) Prior Publication Data
US 2023/0382202 A1 Nov. 30, 2023

(51) Int. Cl.
*B60J 5/04* (2006.01)
*B60J 1/12* (2006.01)

(52) U.S. Cl.
CPC .............. *B60J 5/0425* (2013.01); *B60J 1/12* (2013.01); *B60J 5/0413* (2013.01); *B60J 5/0415* (2013.01); *B60J 5/0436* (2013.01)

(58) Field of Classification Search
CPC ...... B60J 5/0413; B60J 5/0415; B60J 5/0436; B60J 5/0412; B60J 5/04; B60J 1/12
See application file for complete search history.

(56) References Cited

U.S. PATENT DOCUMENTS

| | | | | |
|---|---|---|---|---|
| 3,782,036 A * | 1/1974 | Clark | ..................... | B60J 5/0481 49/502 |
| 4,845,864 A * | 7/1989 | Corliss | ..................... | A43B 5/14 36/131 |
| 7,793,464 B2 * | 9/2010 | Bucker | .................. | E05F 11/382 49/502 |
| 8,042,860 B2 | 10/2011 | Takahashi et al. | | |
| 10,207,569 B2 * | 2/2019 | Moriyama | ............. | B60J 5/0427 |
| 11,390,146 B2 * | 7/2022 | Kimura | ................... | B60J 5/0468 |
| 11,466,481 B2 * | 10/2022 | Muta | ...................... | B60J 5/0413 |
| 2014/0132029 A1* | 5/2014 | Kuroki | ................... | B60J 5/0451 296/1.11 |
| 2016/0107510 A1* | 4/2016 | Jeon | ....................... | B60J 5/0406 49/502 |
| 2020/0101822 A1* | 4/2020 | Kandra | .................. | B60J 5/0404 |

FOREIGN PATENT DOCUMENTS

| | | |
|---|---|---|
| EP | 1439085 A2 | 7/2004 |
| FR | 2938484 A1 | 5/2010 |

* cited by examiner

*Primary Examiner* — Daniel J Troy
*Assistant Examiner* — Susan M. Heschel
(74) *Attorney, Agent, or Firm* — Global IP Counselors, LLP

(57) ABSTRACT

A vehicle door assembly includes an outer door panel that is fixed to an outer periphery of an inner door panel such that the inner door panel and the outer door panel define a door cavity therebetween. A support bracket is attached to a forward area of the inner door panel within the door cavity. A reinforcing panel is attached to the support bracket within the door cavity. A window opening support panel is attached to the support bracket, the reinforcing panel and the inner door panel within the door cavity. A side view mirror is located along an exterior side of the outer door panel. The side view mirror includes at least one fastener that extends through the window opening support panel and the reinforcing panel thereby attaching the side view mirror thereto.

18 Claims, 14 Drawing Sheets

_US 11,872,873 B2_

VEHICLE DOOR ASSEMBLY

BACKGROUND

Technical Field

The present disclosure generally relates to a vehicle door assembly. More specifically, the present disclosure relates to a vehicle door assembly that includes a reinforcing panel that stiffens the overall structure of the door assembly in particular in an area of the door assembly that supports a side mirror assembly.

Background Information

Side view mirrors are typically installed to areas of a vehicle door assembly adjacent to a window at or at least partially above the bottom end of a window opening of the door assembly. Side view mirror are also sometimes installed to the door assembly at a location below the bottom end of the window opening.

SUMMARY

One object of the present disclosure is to provide a vehicle door assembly with a reinforcing panel that strengthens and stiffens the vehicle door assembly in an area where a side mirror assembly is installed.

In view of the state of the known technology, one aspect of the present disclosure is to provide a vehicle door assembly with an inner door panel, an outer door panel, a support bracket, a reinforcing panel, a window opening support panel and a side view mirror. The outer door panel is fixed to an outer periphery of the inner door panel such that the inner door panel and the outer door panel define a door cavity therebetween. The support bracket attached to a forward area of the inner door panel within the door cavity. The reinforcing panel is attached to the support bracket within the door cavity. The window opening support panel is attached to the support bracket, the reinforcing panel and the inner door panel within the door cavity. The side view mirror is located along an exterior side of the outer door panel, the side view mirror including at least one fastener that extends through the window opening support panel and the reinforcing panel thereby attaching the side view mirror thereto.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
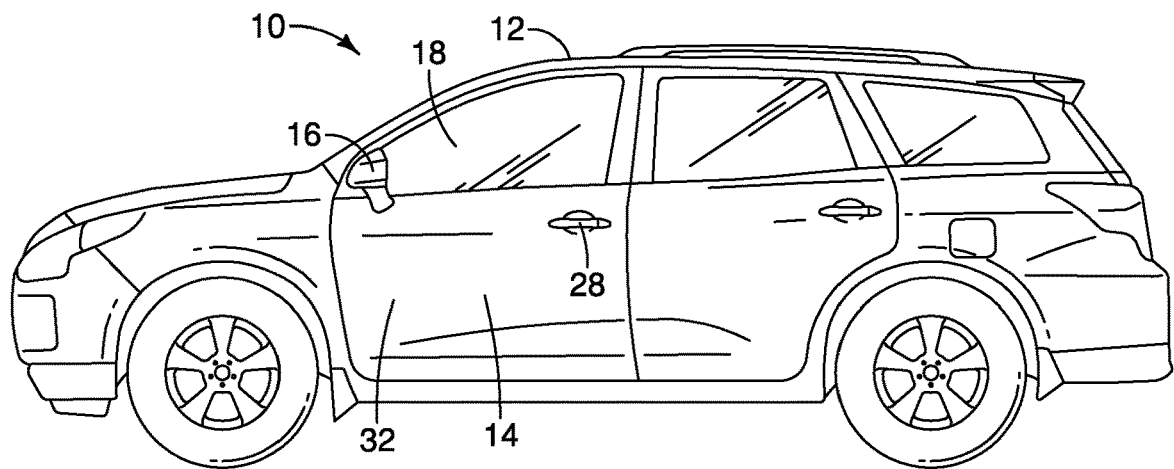
FIG. 1 is a side view of a vehicle having a vehicle door assembly with a side mirror assembly attached to the door assembly in accordance with an exemplary embodiment.

Referring initially to FIG. 1, a vehicle 10 is illustrated in accordance with a first embodiment. The vehicle 10 includes a vehicle body structure 12 with at least one door assembly 14 (also referred to as a vehicle door assembly 14).

Figure 2:
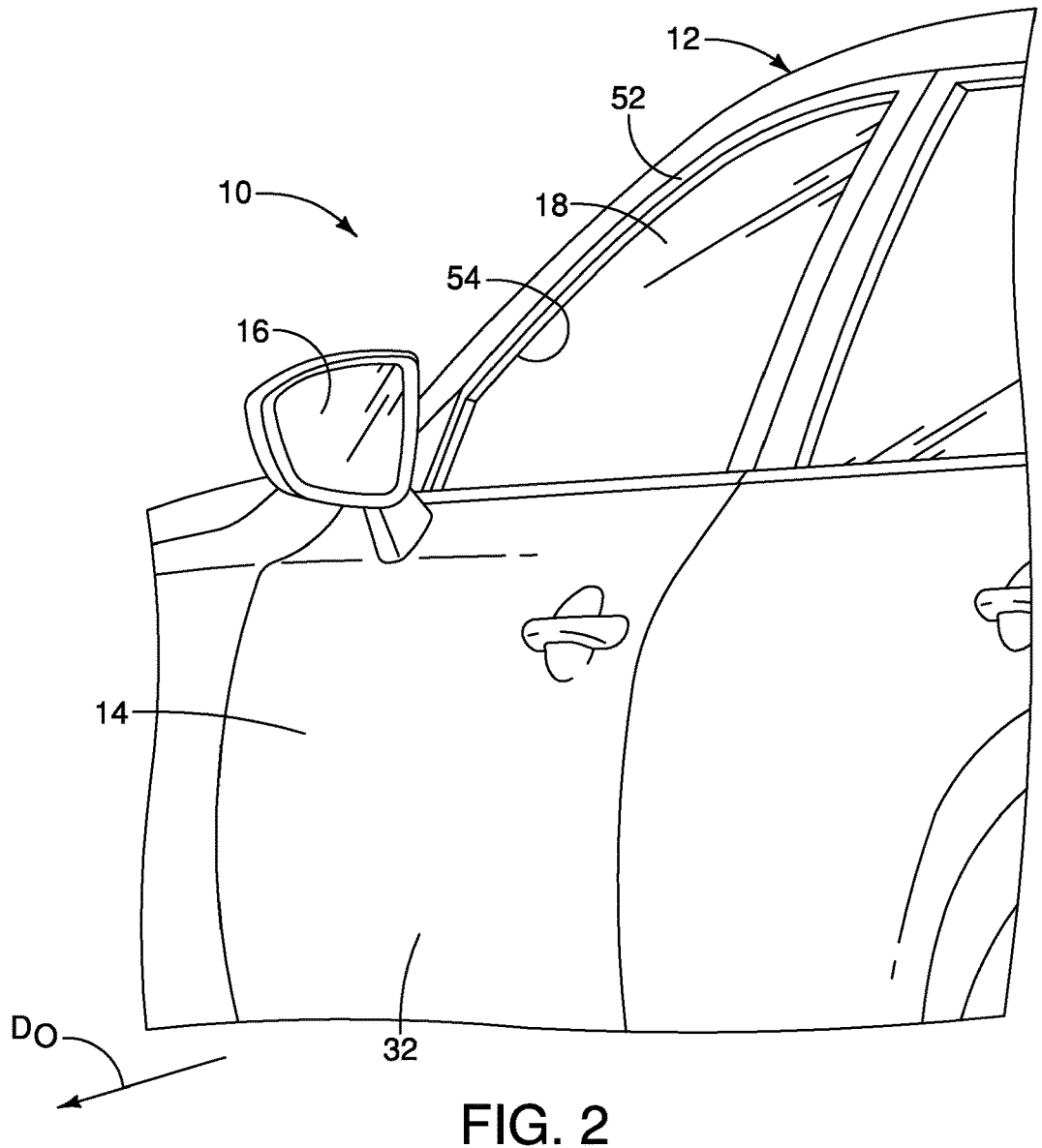
FIG. 2 is a perspective view of the vehicle showing the side mirror assembly installed to the vehicle door assembly in accordance with the exemplary embodiment.
Figure 3:
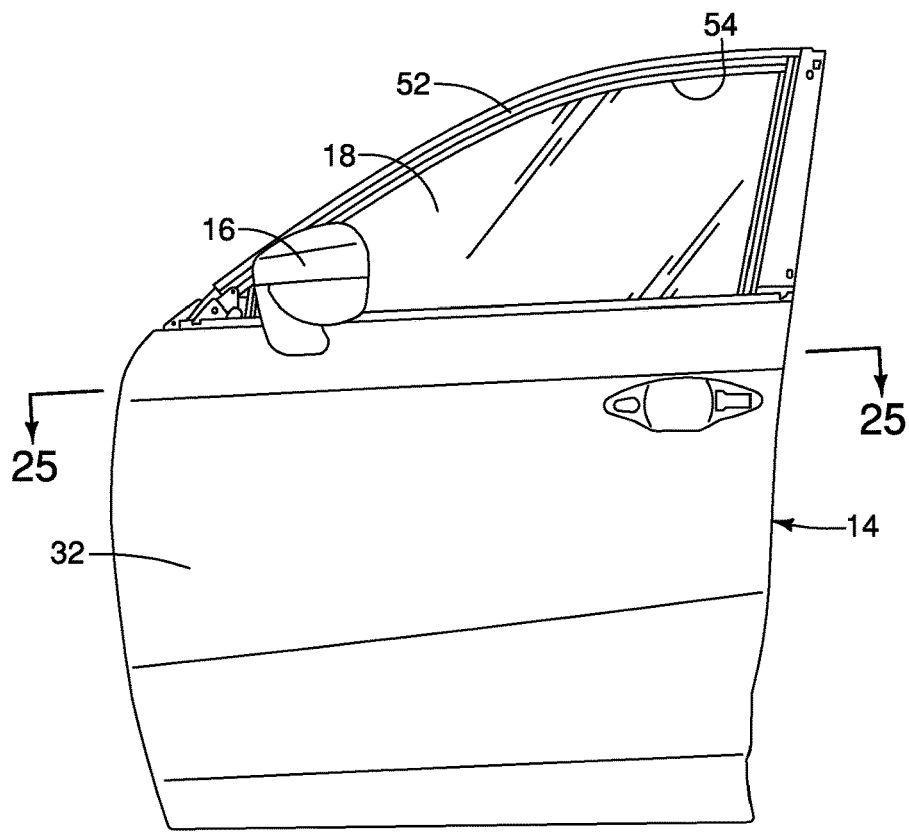
FIG. 3 is a side view of the vehicle door assembly showing the side mirror assembly installed to the vehicle door assembly in accordance with the exemplary embodiment.

As shown in FIGS. 1-3, a side mirror assembly 16 is attached to the door assembly 14 at a location below a window 18. The door assembly 14 structured to provide rigid support for the side mirror assembly 16, as is described in greater detail below.

Figure 4:
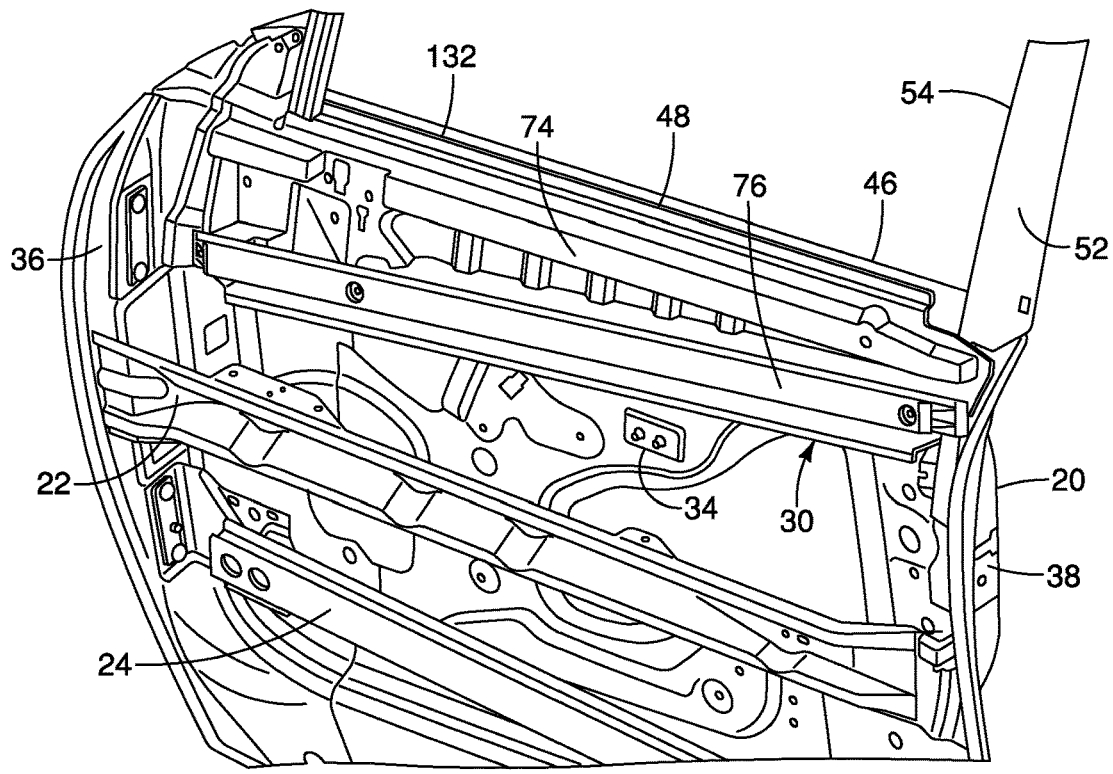
FIG. 4 is a perspective view of the vehicle door assembly partially dis- assembled to show features of the inner door panel and a reinforcement assembly in accordance with the exemplary embodiment.
Figure 5:
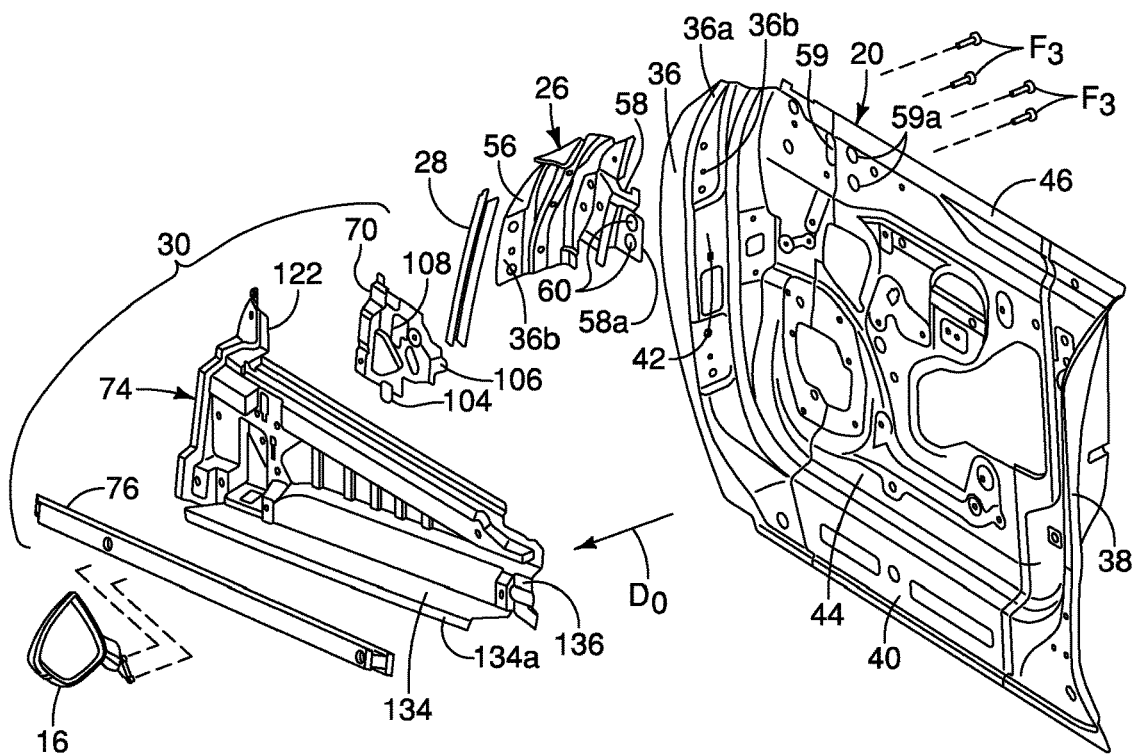
FIG. 5 is an exploded perspective view of the vehicle door assembly showing an inner door panel, a support bracket, a portion of a window track and elements of the reinforcement assembly including a reinforcing panel, a window opening support panel and a stiffening beam in accordance with the exemplary embodiment.

As shown in FIGS. 4 and 5, the door assembly 14 basically includes an inner door panel 20, lower reinforcement beams 22 and 24 (FIG. 4 only), a support bracket 26, a window track 28, a reinforcement assembly 30 and an outer door panel 32 (shown in FIGS. 1-3). Most, if not all, of the elements that make up the door assembly 14 can be made of aluminum, aluminum alloy or other metallic materials.

Figure 6:
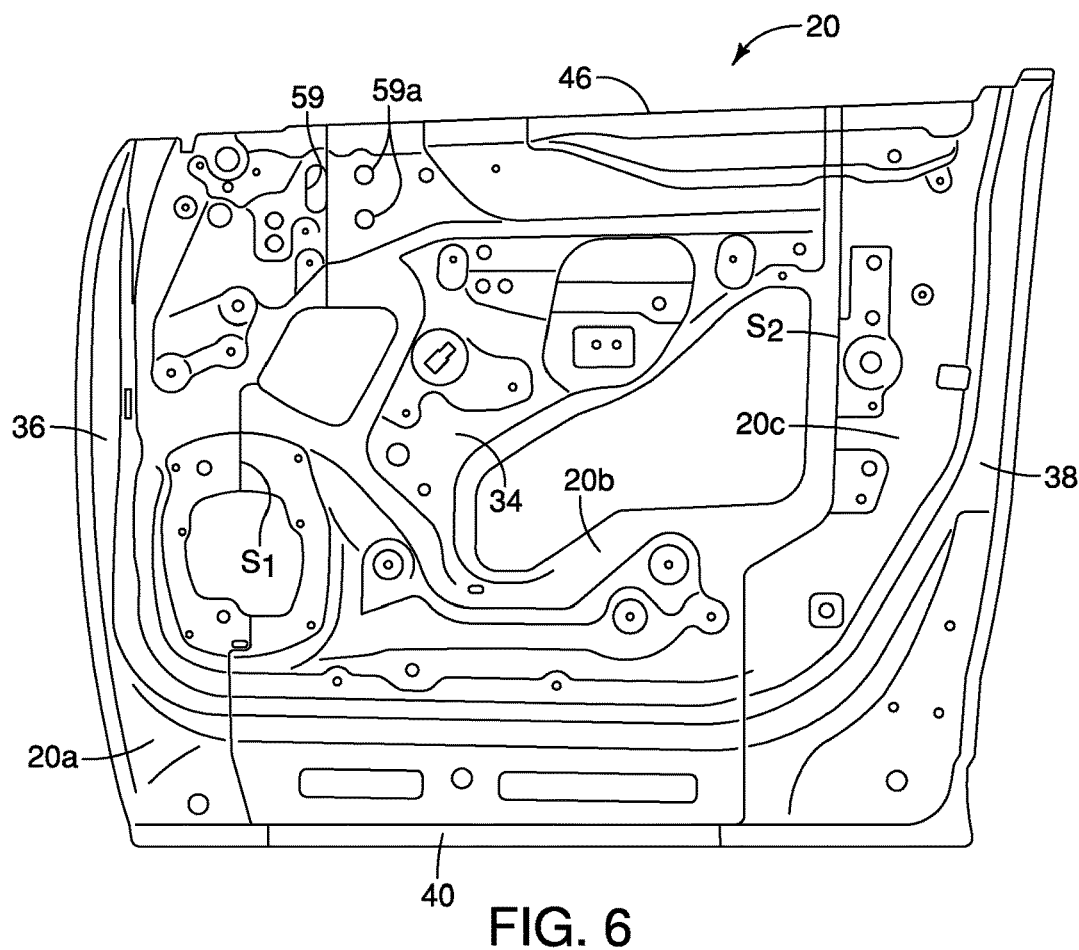
FIG. 6 is a side view of the vehicle door assembly showing only the inner door panel with all other structures removed in accordance with the exemplary embodiment.

As shown in FIG. 6, the inner door panel 20 itself can be assembled from a plurality of panel portions 20a, 20b and 20c that are welded or otherwise fixed to one another at seams $S_1$ and $S_2$. Although the inner door panel 20 is assembled from the plurality of panels 20a, 20b and 20c, for purpose of description herein below, the inner door panel 20 is a single element of the door assembly 14.

The inner door panel 20 is shaped and dimensioned to include a main panel portion 34, a front peripheral portion 36, a rear peripheral portion 38 and a lower peripheral portion 40. The main panel portion 34 extends the full horizontal length of the door assembly 14 from the front peripheral portion 36 to the rear peripheral portion 38 and downward to the lower peripheral portion 40.

As shown in FIGS. 4 and 5, the front peripheral portion 36 includes a section 42 that extends laterally in an outboard direction Do from the main panel portion 34. The main panel portion 34, the section 42 of the front peripheral portion 36, the rear peripheral portion 38 and the lower peripheral portion 40 define inboard, rearward, lower and forward boundaries of a door cavity 44 that is further confined between the main panel portion 34 of the inner door panel 20 and the outer door panel 32.

Figure 27:
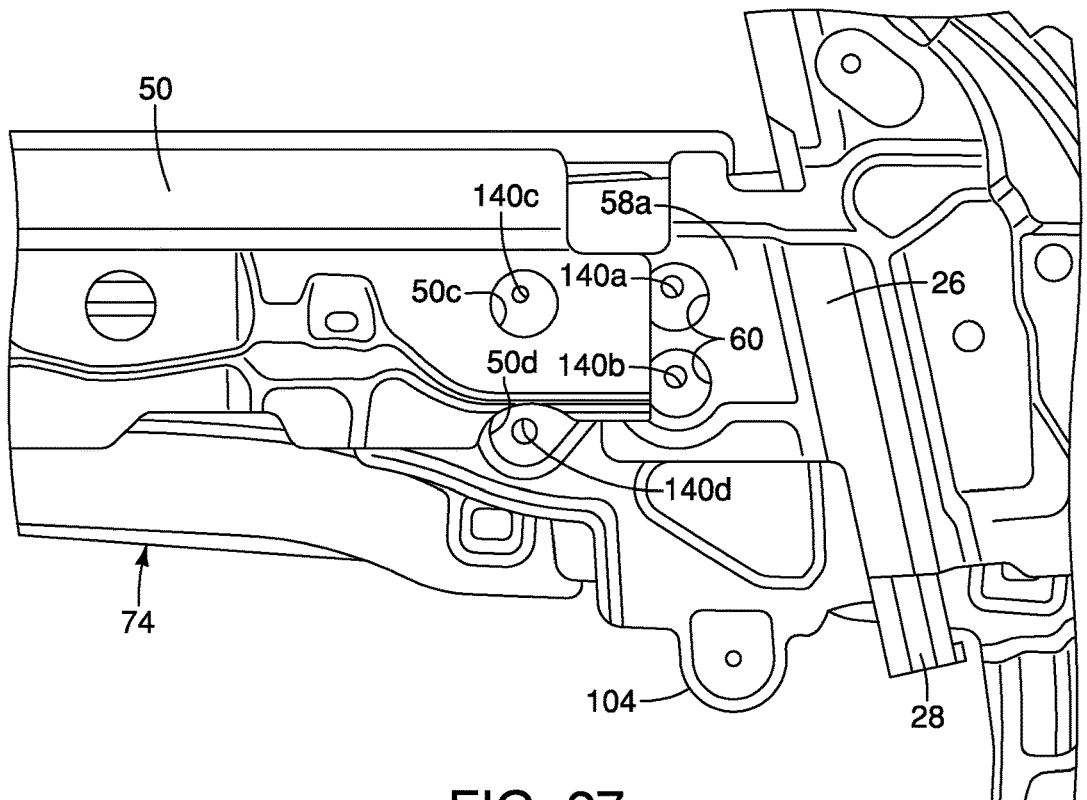
FIG. 27 is another side view of the reinforcement assembly with a stiffening panel of the inner door panel and the support bracket overlaying a forward portion of the inboard side of the reinforcement assembly in accordance with the exemplary embodiment.

As shown in FIGS. 5-7 and 12, an upper edge portion 46 of the inner door panel 20 defines an inboard side of a window slot 48. The upper edge portion 46 can include a window slot stiffener 50 that is welded or otherwise fixedly attached to the upper edge portion 46 of the inner door panel 20. The window slot stiffener 50 is depicted in FIG. 27 but with the inner door panel 20 removed to reveal further details discussed below. As shown in FIG. 27, the window slot stiffener 50 includes fastener alignment openings 50c and 50d that are provided for installation of the side mirror assembly 16, as is described further below. As shown in FIGS. 2, 3 and 4, a window rail 52 is attached to the upper end of each of the front peripheral portion 36 and the rear peripheral portion 38 of the inner door panel 20 defining a window opening 54. As shown in FIGS. 6 and 8, the main panel portion 34 of the inner door panel 20 includes a mirror access slot 59 and a pair of mirror access openings 59a, whose function is described in greater detail below.

As shown in FIG. 4, the lower reinforcement beams 22 and 24 extend between and are fixed to the front peripheral portion 36 and the rear peripheral portion 38. Since the lower reinforcement beams 22 and 24 are conventional structural features well known in the art, further description is omitted for the sake of brevity.

Figure 7:
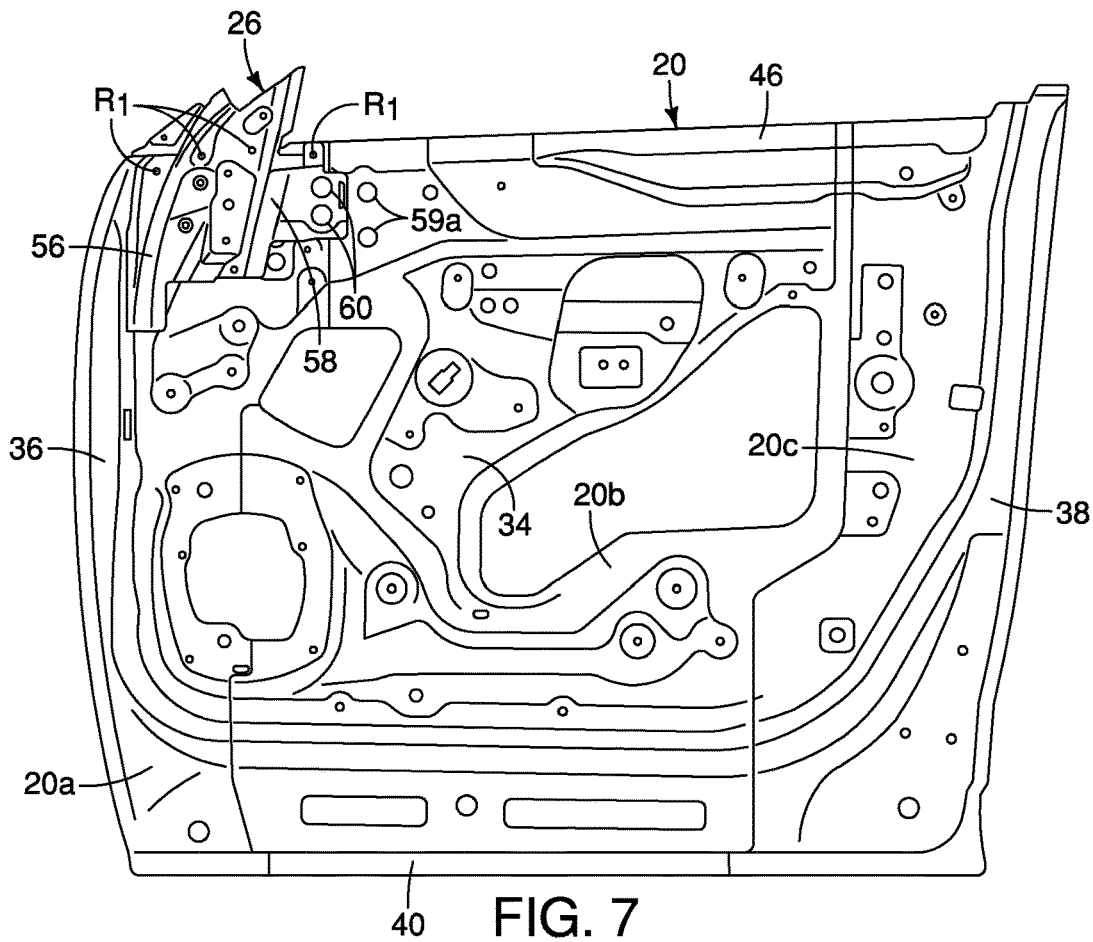
FIG. 7 is another side view of the inner door panel with the support bracket installed thereto in accordance with the exemplary embodiment.
Figure 8:
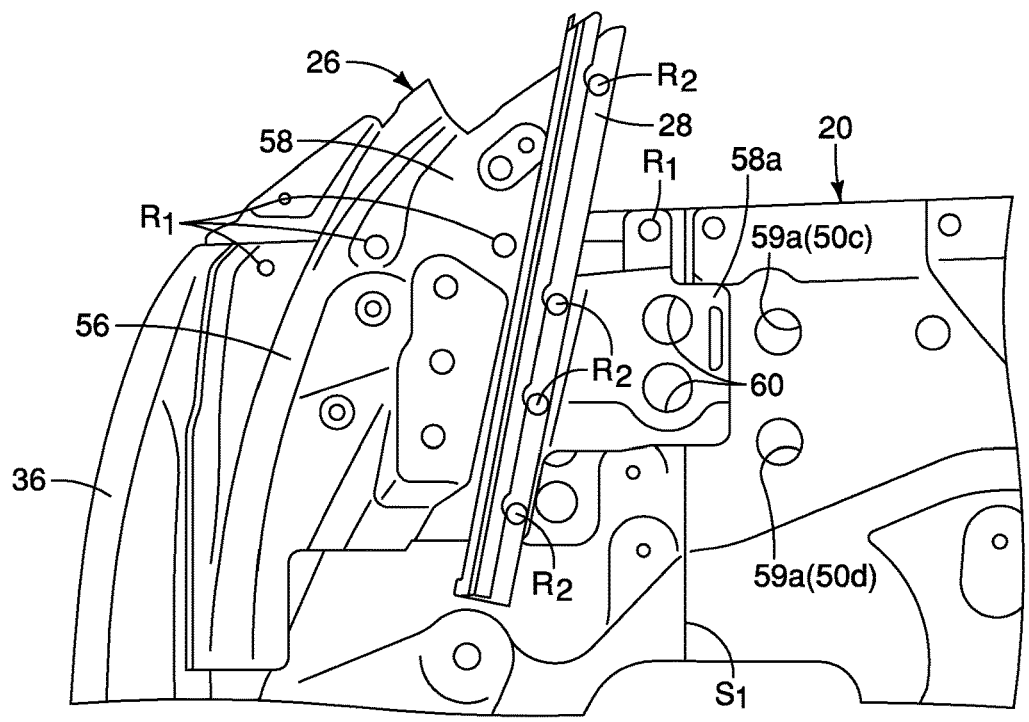
FIG. 8 is a side view of a portion of the inner door panel depicted in FIG. 7 with a portion of the window track installed to the support bracket in accordance with the exemplary embodiment.

As shown in FIGS. 5, 7 and 8, the support bracket 26 includes a first portion 56 and a second portion 58. The first portion 56 extends laterally in the outboard direction Do from the second portion 58 and overlays an upper area 36a of the front peripheral portion 36 of the inner door panel 20. The upper area 36a of the front peripheral portion 36 and the first portion 56 of the support bracket 26 define an upper hinge area 36b of the door assembly 14. An upper hinge (not shown) is attached to the upper hinge area 36b and supports the door assembly 14 to the A-pillar of the vehicle body structure 12 in a conventional manner. The second portion 58 overlays a forward upper area 34a of the main panel portion 34 of the inner door panel 20 and is fixed thereto via rivets $R_1$.

As shown in FIGS. 7 and 8, a rearward section 58a second portion 58 of the support bracket 26 includes two mirror fastener access openings 60 that align with an access slot 59 of the inner door panel 20. As is also shown in FIG. 8, the support bracket 26 does not extend rearward to the mirror access openings 59a. Thus, in FIGS. 7 and 8, the mirror access openings 59a are visible.

The support bracket 26 is attached to the inner door panel 20 via the rivets $R_1$, as shown in FIG. 8. The window track 28 is attached to the second portion 58 of the support bracket 26 via rivets $R_2$. The window track 28 is aligned with the window slot 48 in a conventional manner. With the reinforcement assembly 30 installed to the inner door panel 20, the window track 28 is located between the support bracket 26 and the reinforcement assembly 30, as shown in cross-section in FIG. 25.

Figure 9:
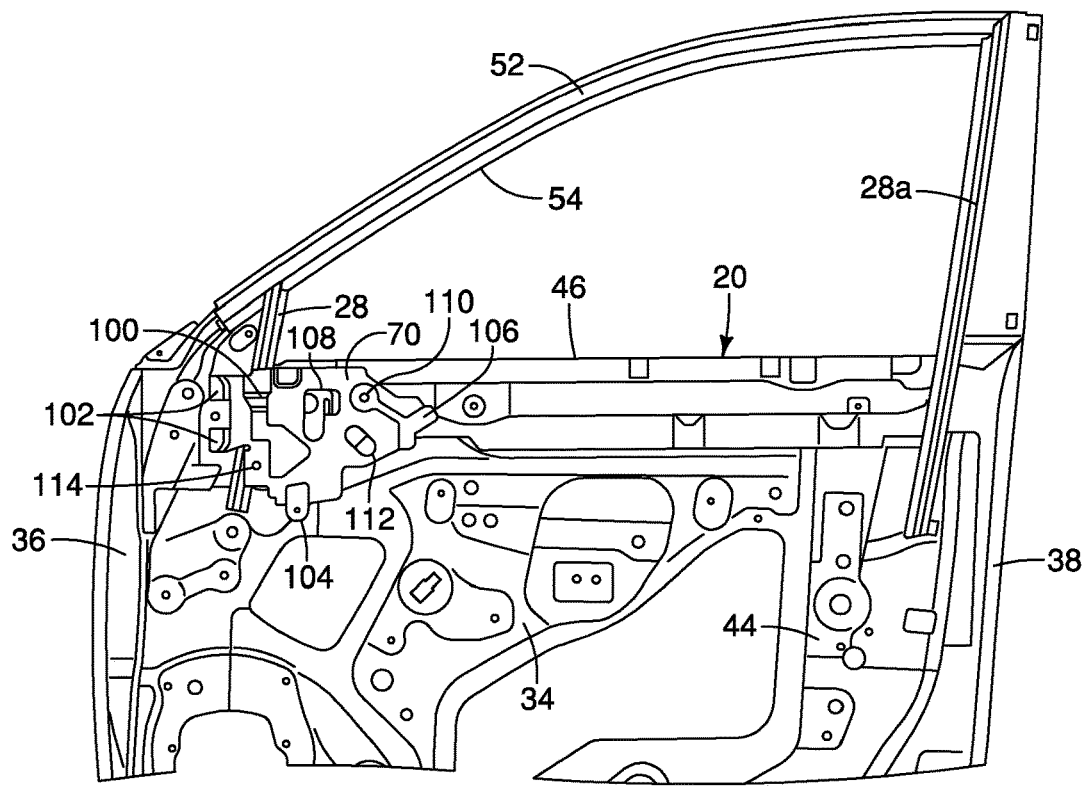
FIG. 9 is a side view of the inner door panel, the support bracket and the portion of the window track showing the reinforcing panel removed from the reinforcement assembly with the reinforcing panel overlaying the support bracket and the window track in its installed orientation in accordance with the exemplary embodiment.

As shown in FIGS. 3, 4 and 9, the window rail 52 is attached to the inner door panel 20 and the support bracket 26 in a conventional manner. Once the window rail 52 is installed, the window opening 54 is defined between the window rail 52 and the upper edge portion 46 of the inner door panel 20. The window rail 52 includes a rear window track 28a. Since window tracks, such as the window track 28 and the rear window track 28a are conventional structures, further description will be omitted for the sake of brevity.

As shown in FIG. 6, the reinforcement assembly 30 includes a reinforcing panel 70, a window opening support panel 74 and a stiffening beam 76.

Figure 10:
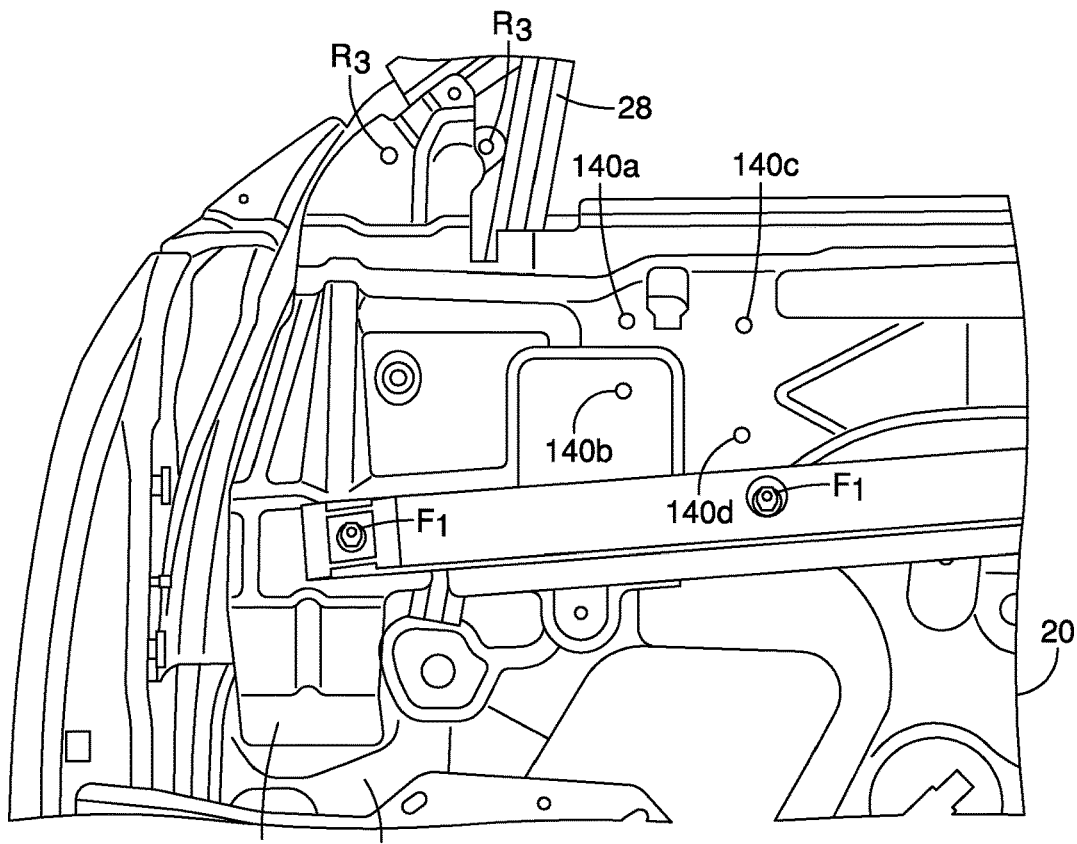
FIG. 10 is another side view of the inner door panel, the support bracket and the portion of the window track showing the reinforcement assembly installed to the inner door panel in accordance with the exemplary embodiment.
Figure 11:
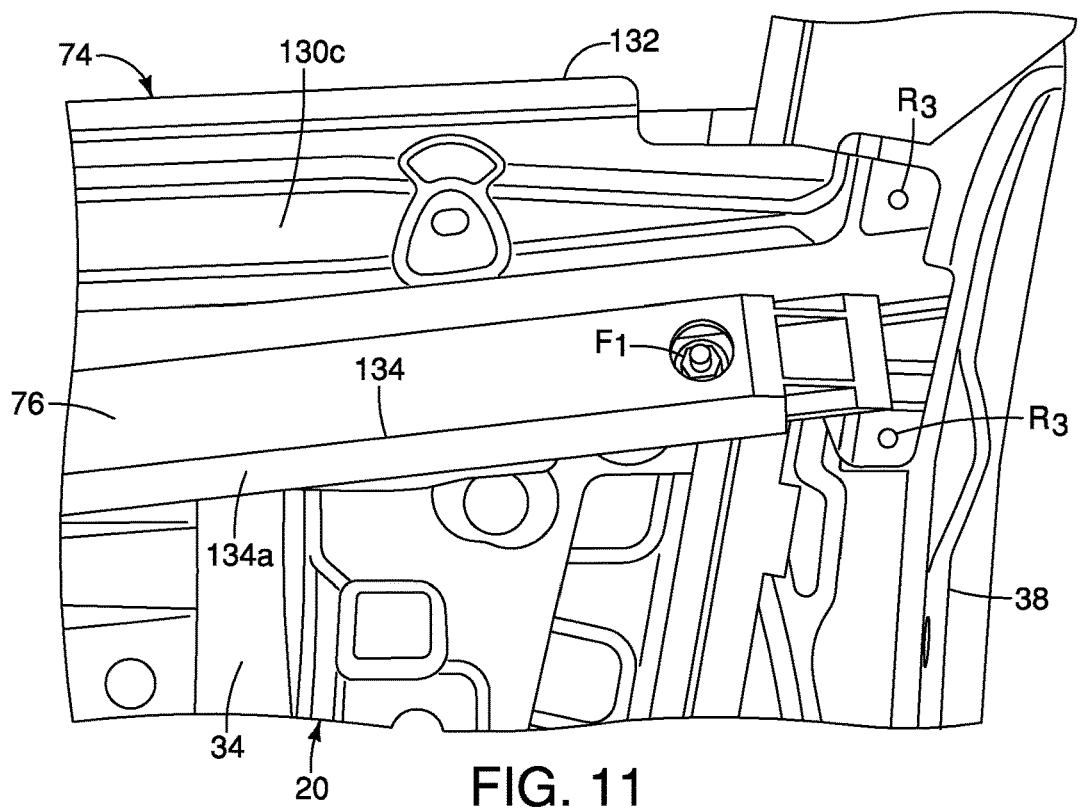
FIG. 11 is a side view of a rearward portion of the inner door panel showing a rearward portion of the reinforcement assembly installed thereto in accordance with the exemplary embodiment.
Figure 12:
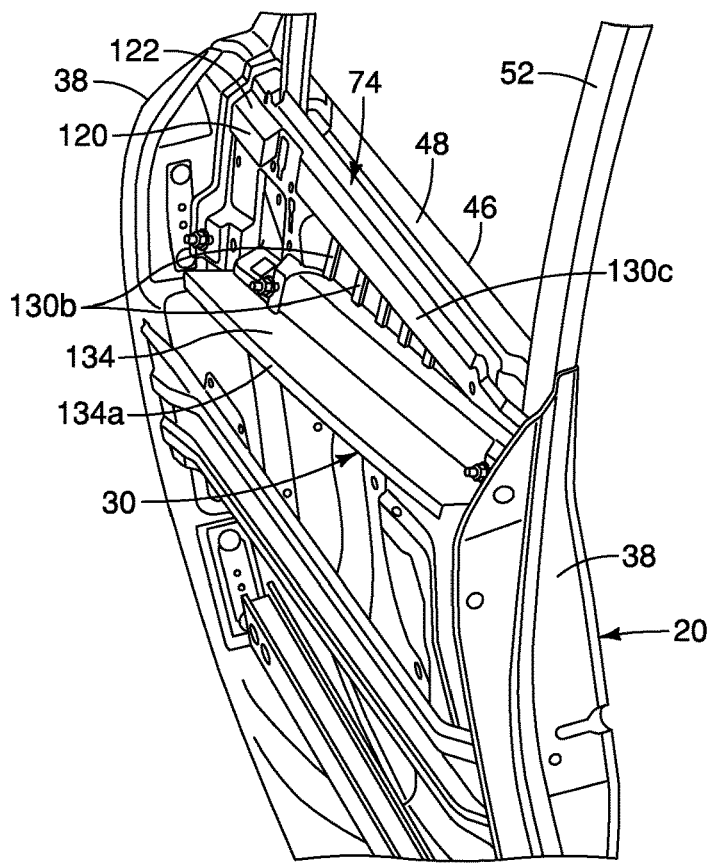
FIG. 12 is a perspective view of the inner door panel with the reinforcement assembly installed thereto in accordance with the exemplary embodiment.

The reinforcing panel 70 and the window opening support panel 74 can assembled together with or without the stiffening beam 76 as a separate structure from the inner door panel 20 thereby defining the reinforcement assembly 30. After the reinforcement assembly 30 is assembled, it is then installed to the inner door panel 20 and the support bracket 26, as shown in FIGS. 10-12. The stiffening beam 76 can be installed to the window opening support panel 74 of the reinforcement assembly 30 prior to attachment to the inner door panel 20 via fasteners $F_1$. Alternatively, the stiffening beam 76 can be installed to the reinforcement assembly 30 and the inner door panel 20 after the reinforcement assembly 30 is installed to the inner door panel 20. A more detailed description of the reinforcement assembly 30 is provided further below.

In order to show orientation and relative positioning of the elements of the door assembly 14, FIG. 9 shows the reinforcing panel 70 (removed from the reinforcement assembly 30) installed to the inner door panel 20 and the support bracket 26. However, it should be understood, that preferably, the reinforcing panel 70 is part of the reinforcement assembly 30 and is installed to the inner door panel 20 with the reinforcing panel 70 as a part of the reinforcement assembly 30.

As shown in FIGS. 10-13, once the reinforcement assembly 30 is installed to the inner door panel 20, at least a portion of the reinforcing panel 70 and at least a portion of the support bracket 26 are concealed by the remainder of the reinforcement assembly 30. As shown in FIG. 11, the rearward end of the reinforcement assembly 30 is attached to the rear peripheral portion 38 of the inner door panel 20. The window slot 48 is defined between the window opening support panel 74 and the upper edge portion 46 of the inner door panel 20.

Figure 14:
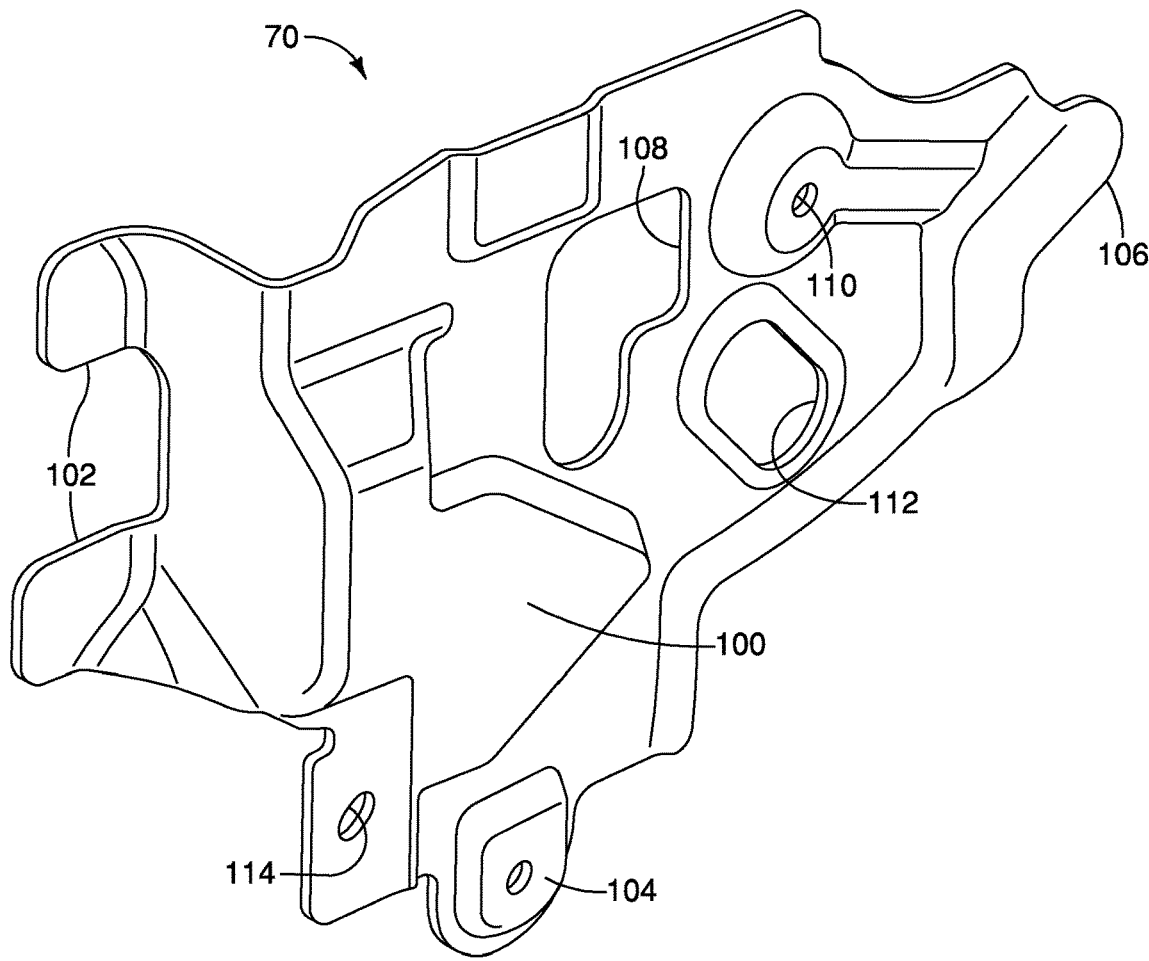
FIG. 14 is a perspective view of the reinforcing panel shown removed from the reinforcement assembly and the vehicle door assembly in accordance with the exemplary embodiment.
Figure 15:
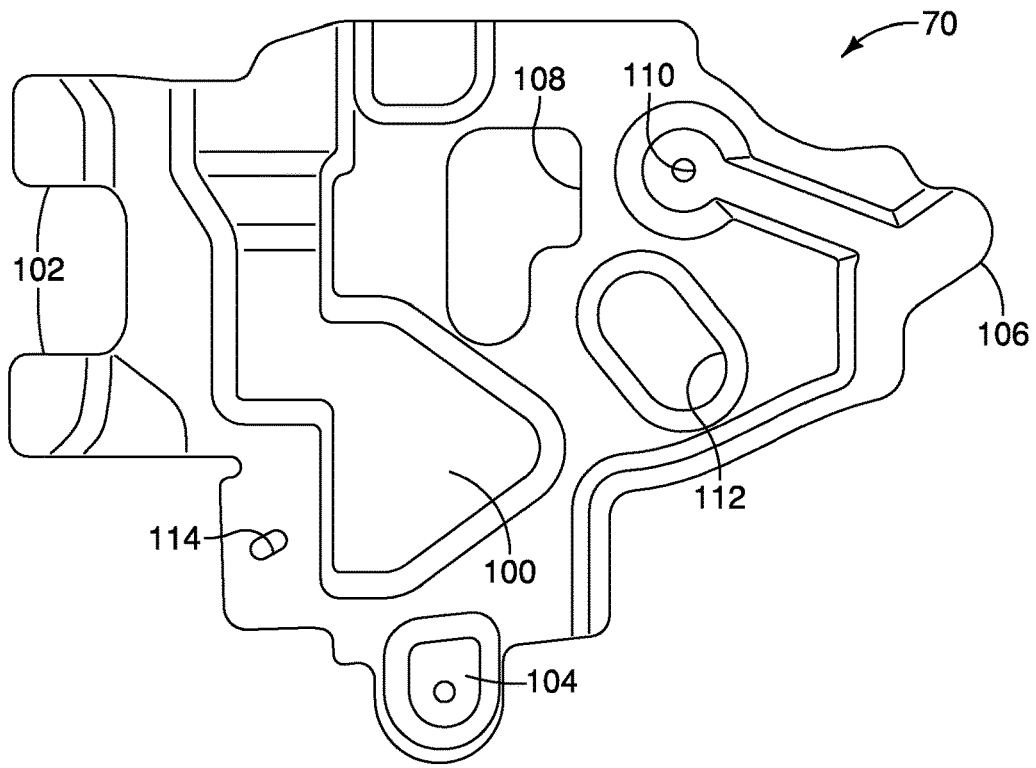
FIG. 15 is a view of an outboard side of the reinforcing panel removed from the reinforcement assembly and the vehicle door assembly in accordance with the exemplary embodiment.
Figure 16:
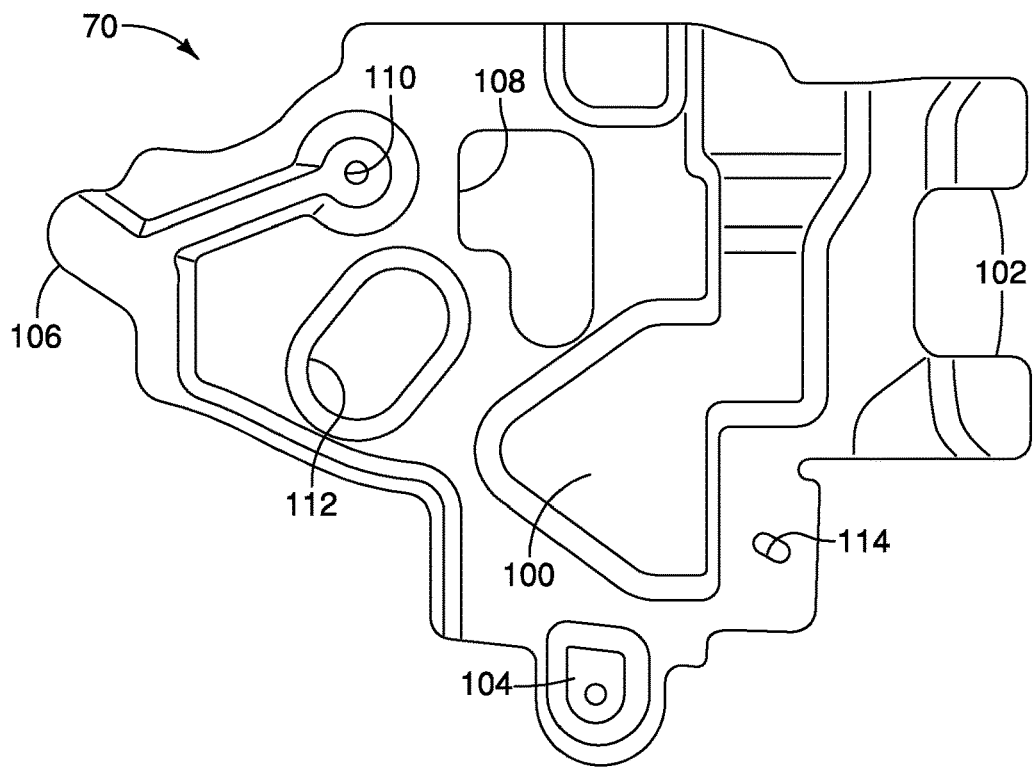
FIG. 16 is a view of an inboard side of the reinforcing panel removed from the reinforcement assembly and the vehicle door assembly in accordance with the exemplary embodiment.
Figure 17:
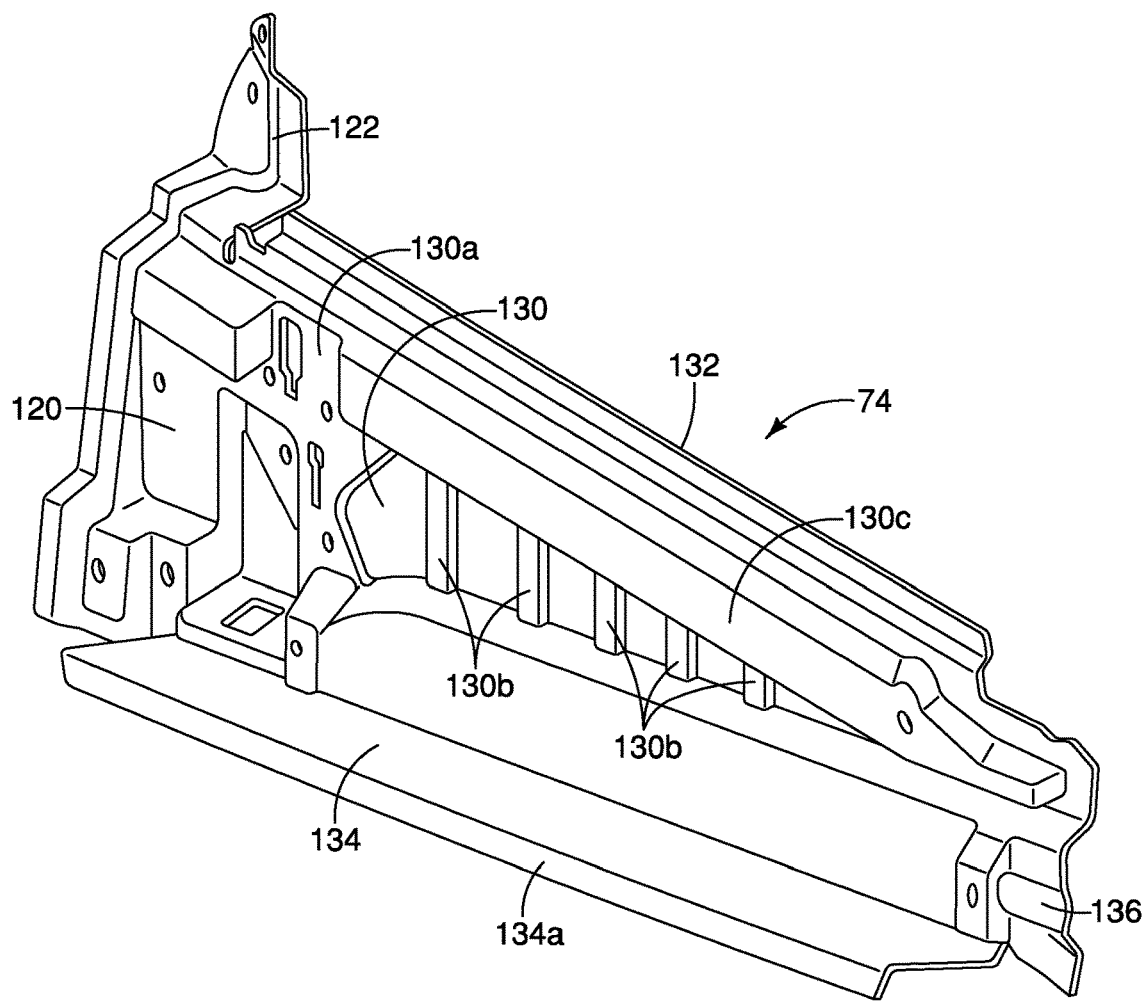
FIG. 17 is a perspective view of the window opening support panel removed from the vehicle door assembly and the reinforcement assembly in accordance with the exemplary embodiment.
Figure 18:
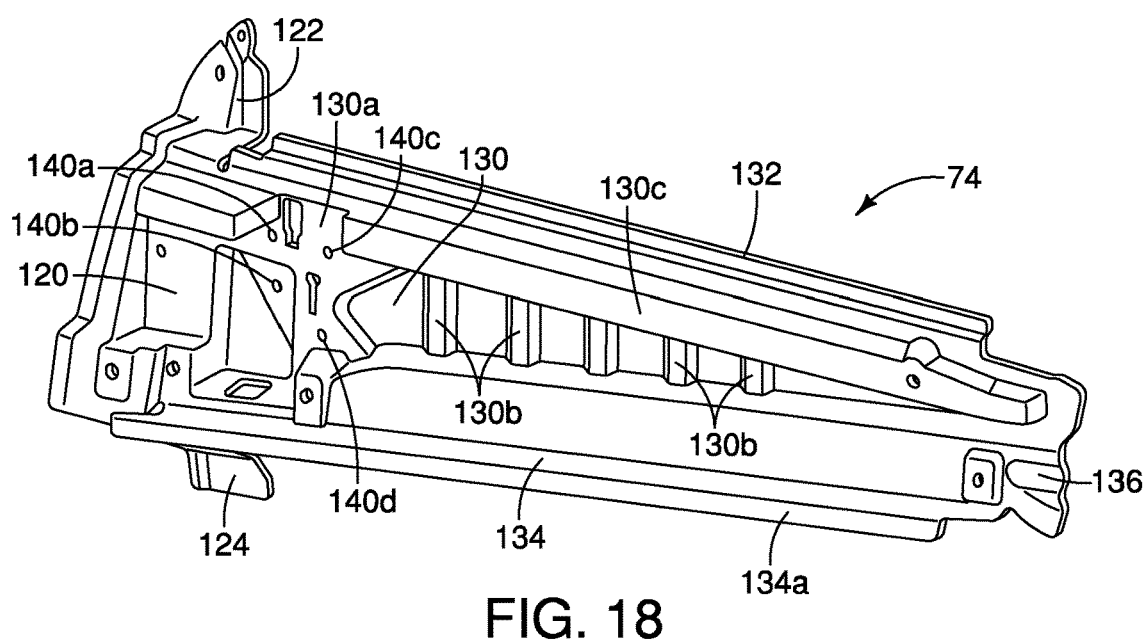
FIG. 18 is another perspective view of the window opening support panel removed from the vehicle door assembly and the reinforcement assembly in accordance with the exemplary embodiment.
Figure 19:
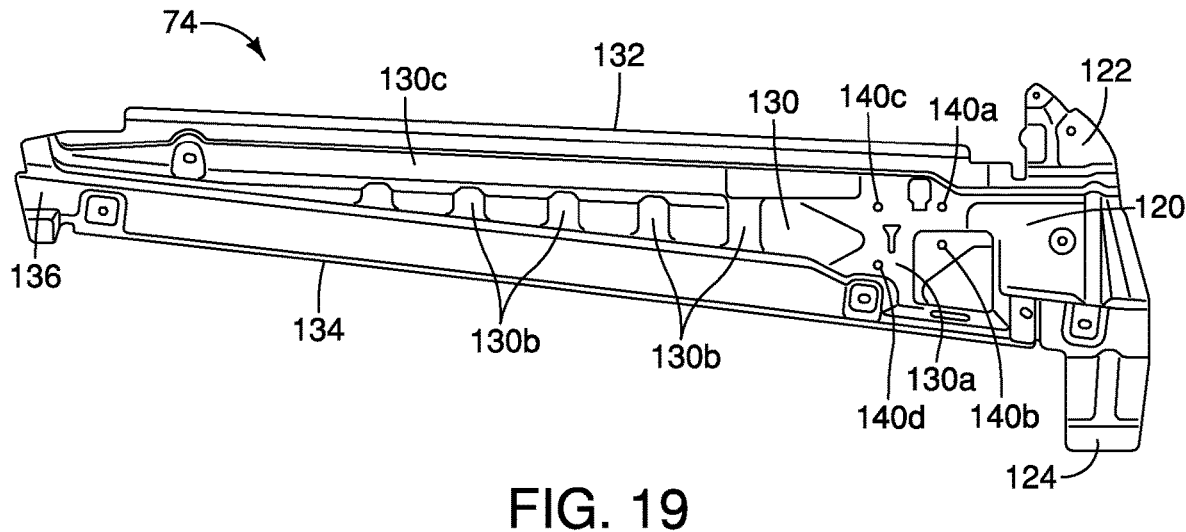
FIG. 19 is a side view of the window opening support panel showing an inboard side thereof in accordance with the exemplary embodiment.

A description of the reinforcing panel 70 (part of the reinforcement assembly 30) is now provided with specific reference to FIGS. 14-16. The reinforcing panel 70 has a main section 100, a pair of forward flanges 102, a lower flange 104 and a rearward flange 106. The reinforcing panel 70 also includes a plurality of openings 108, 110, 112 and 114

With the reinforcement assembly 30 installed to the inner door panel 20 and the support bracket 26, the opening 108 of the reinforcing panel 70 aligns with, but is larger than, the two mirror fastener access openings 60 in the support bracket 26. The opening 110 of the reinforcing panel 70 aligns with the upper one of the two mirror access openings 59a in the inner door panel 20. Further, the opening 112 of the reinforcing panel 70 aligns with the upper one of the two mirror access openings 59a in the inner door panel 20.

Figure 25:
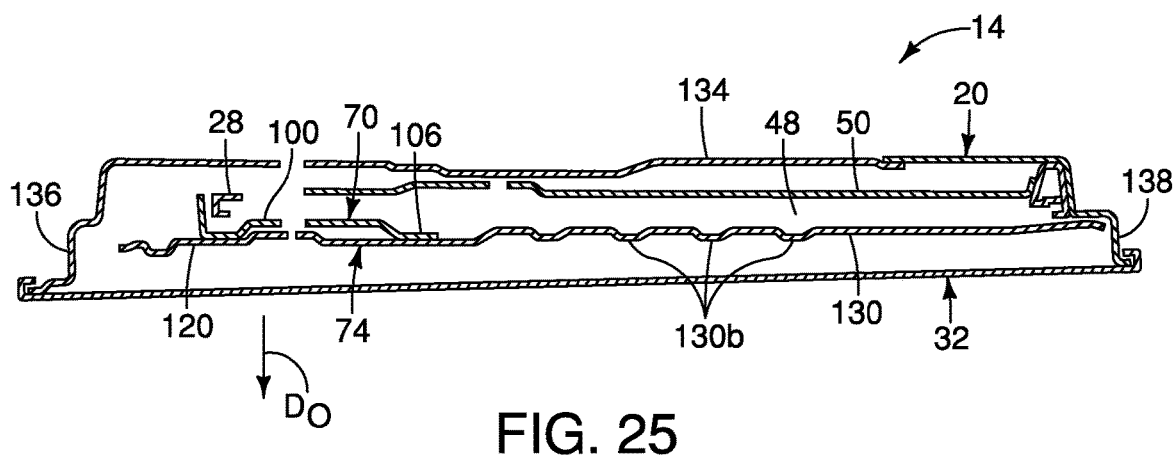
FIG. 25 is a top cross-sectional view of the door assembly taken along the line 25-25 in FIG. 3 showing the relationships between the inner door panel, the support bracket, the reinforcing panel and the window opening support panel in accordance with the exemplary embodiment.

When the reinforcement assembly 30 is installed to the inner door panel 20 and the support bracket 26, the forward flanges 102 of the reinforcing panel 70 are both attached to the support bracket 26. Further, the rearward flange 106 of the reinforcing panel 70 is attached the window opening support panel 74, as shown in FIG. 25. The main section 100 of the reinforcing panel 70 is located outboard relative to the window slot 48, as shown in FIG. 7. The forward flanges 102 extend in an inboard direction and attach directly to the support bracket 26, as shown in FIGS. 9 and 25.

A description of the reinforcement assembly 30 is now provided with reference to FIGS. 6, 12-14 and 18-25. As mentioned above, the reinforcement assembly 30 includes the reinforcing panel 70 (described above), the window opening support panel 74 and the stiffening beam 76.

As shown in FIGS. 17-24, the window opening support panel 74 includes a forward section 120, a forward upper flange 122, a forward lower flange 124, a main panel portion 130, an upper flange 132, a lower flange 134 and a rear end 136.

The forward upper flange 122 extends upward from the forward section 120. Similarly, the forward lower flange 124 extends downward from the forward section 120. As shown in FIGS. 17-20, the main panel portion 130 includes a flat section 130a with four openings 140a, 140b, 140c and 140d that are described in greater detail below. The main panel portion 130 also includes a plurality of vertically oriented ribs 130b that stiffen and strengthen the window opening support panel 74. A horizontal rib 130c extends from the rear end 130 to the flat section 130a of the main panel portion 130 further stiffening and strengthening the window opening support panel 74.

The upper flange 132 extends along the main panel portion 130 and defines an outboard side of the window slot 48, as shown in FIG. 4.

The lower flange 134 extends in an outboard direction from the main panel portion 130 and is approximately horizontally oriented with a slight incline in a vehicle forward direction. The lower flange 134 also includes a downwardly extending and elongated flange section 134a.

Figure 21:
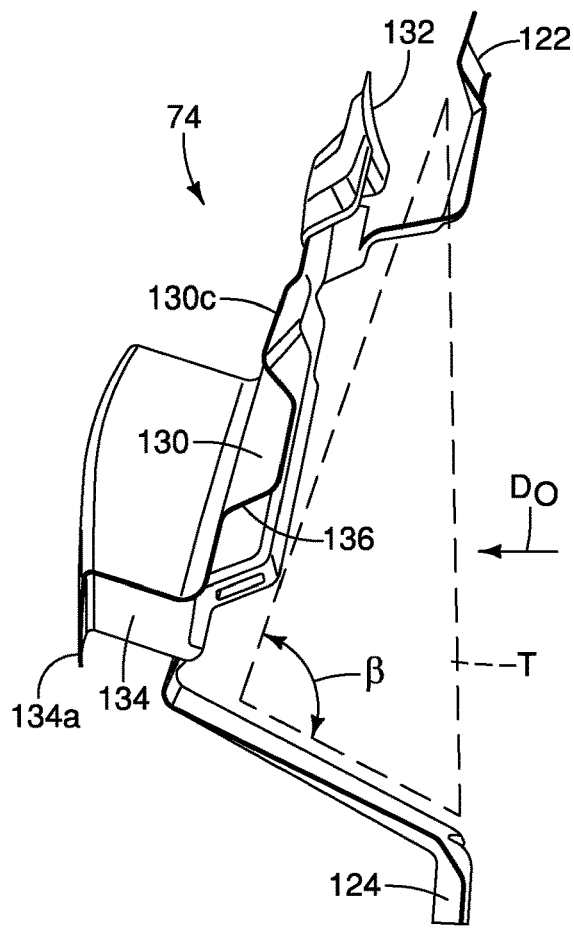
FIG. 21 is a rear view of the window opening support panel in accordance with the exemplary embodiment.
Figure 22:
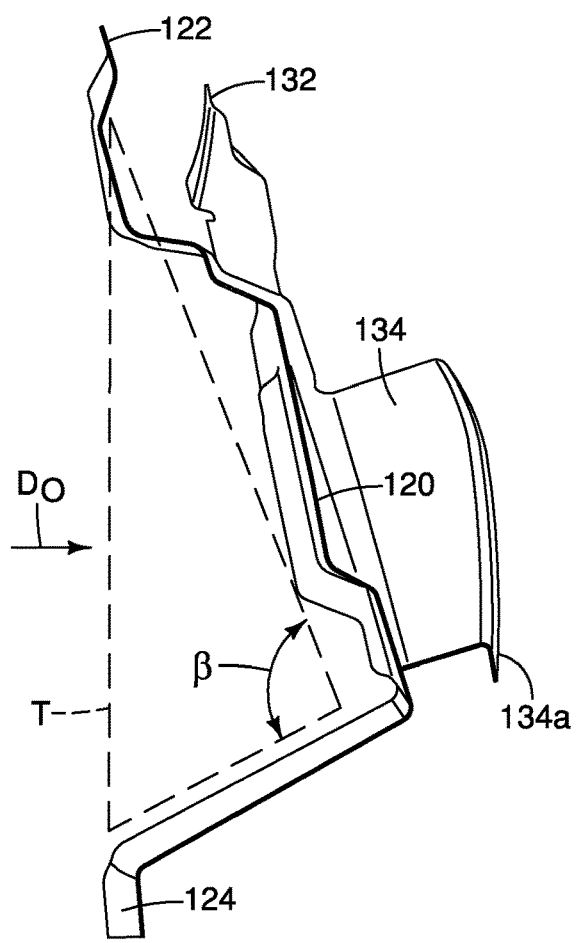
FIG. 22 is a front view of the window opening support panel in accordance with the exemplary embodiment.
Figure 23:
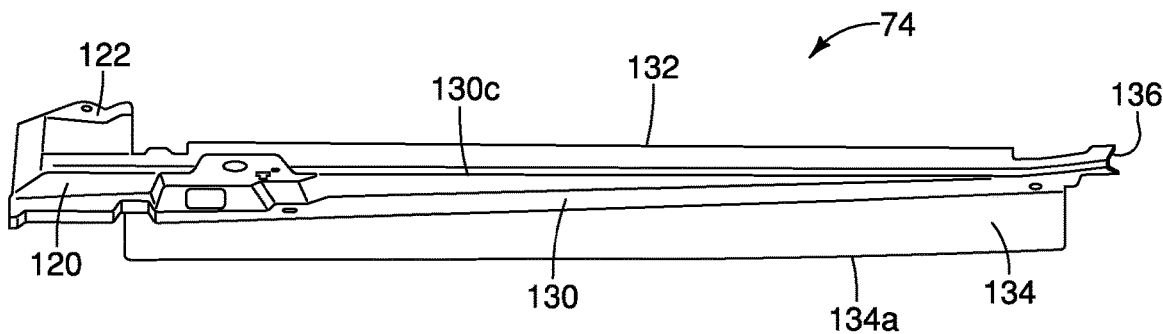
FIG. 23 is a top view of the window opening support panel in accordance with the exemplary embodiment.
Figure 24:
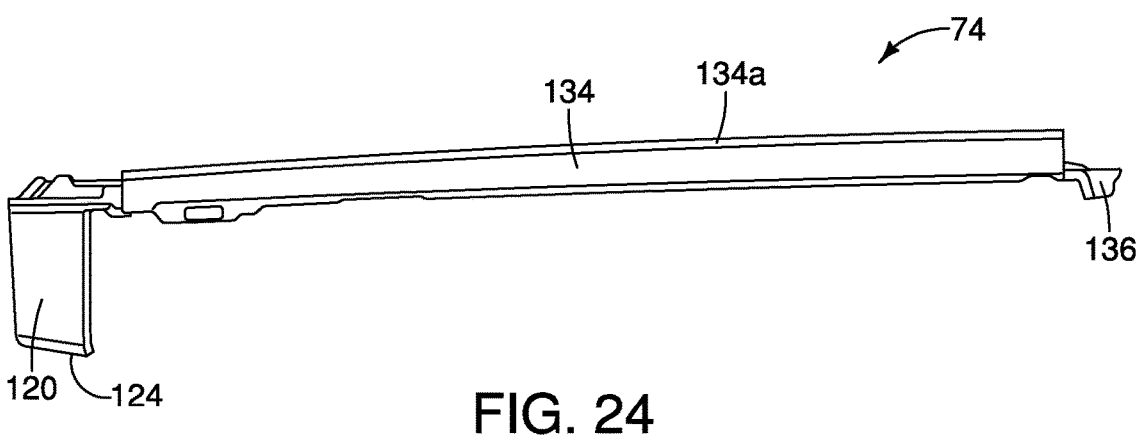
FIG. 24 is a bottom view of the window opening support panel in accordance with the exemplary embodiment.

As shown in the rear and front views in FIGS. 21 and 22, the overall end profile of the window opening support panel 74 can approximately define a triangle shape T. More specifically, the main panel portion 130 and the lower flange 134 define an obtuse angle 13 therebetween as viewed from an end of the window opening support panel. The obtuse angle 13 is between 91 and 115 degrees but can be further limited to being between 100 and 110 degrees. In the depicted embodiment, the obtuse angle 13 is approximately 105 degrees. Preferably, the angle 13 can also correspond to an angle defined between the main panel portion 130 and the lower flange 134.

The obtuse angle 13 and the corresponding triangle shape T provides rigidity and resistance to vibration to the overall structure of the door assembly 14. The downwardly extending elongated flange section 134a of the flower flange 134 provides further stiffness and can optionally be attached via a mastic to the outer door panel 32.

Figure 13:
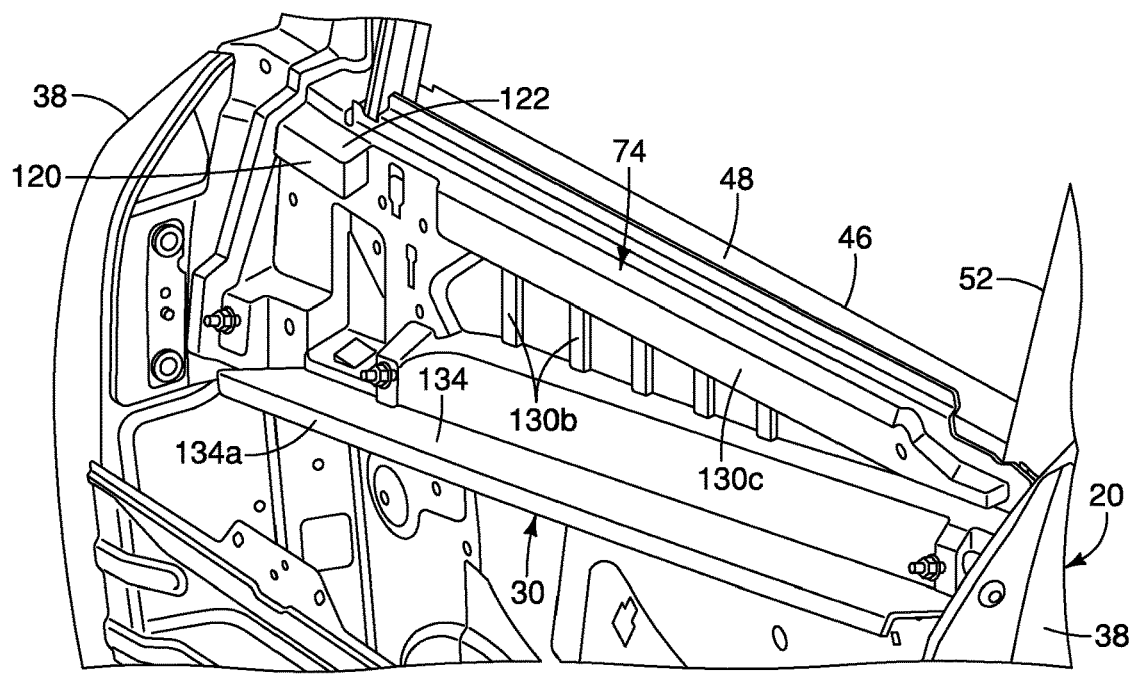
FIG. 13 is another perspective view of the inner door panel with the reinforcement assembly installed thereto in accordance with the exemplary embodiment.
Figure 20:
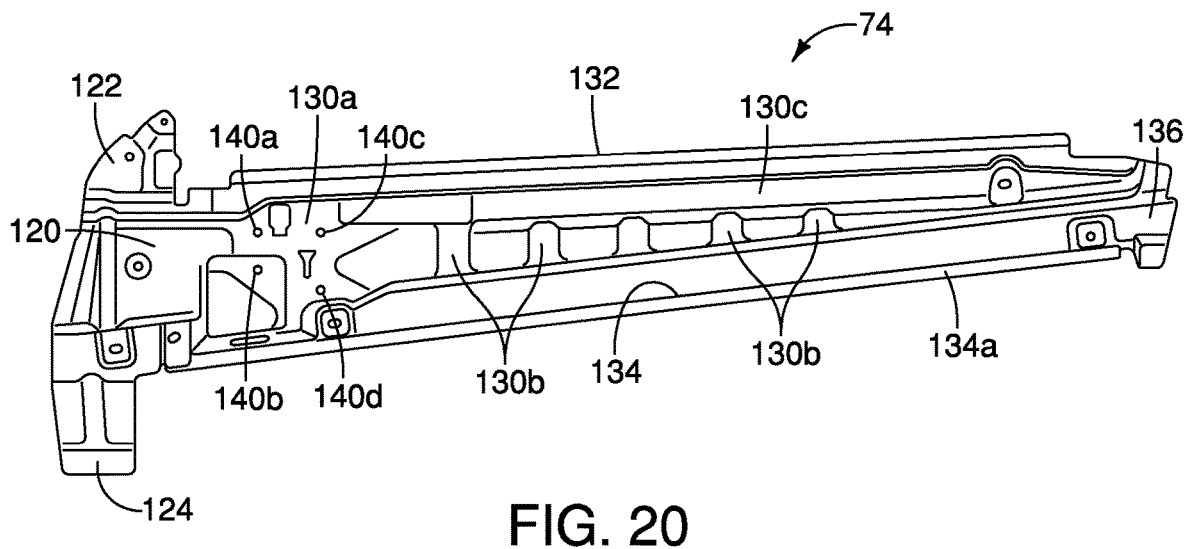
FIG. 20 is another side view of the window opening support panel showing an outboard side thereof in accordance with the exemplary embodiment.

When the reinforcement assembly 30 is attached to the inner door panel 20 and the support bracket 26, the upper flange portion 122 of the window opening support panel 74 attaches to an upper area of the second portion 58 of the support bracket 26, as shown in FIG. 10 via rivets $R_3$. Further, as shown in FIGS. 12-13 and 20, the lower flange 124 of the window opening support panel 74 is attached to the main panel portion 34 of the inner door panel 20 via spot welds or rivets (not shown).

As shown in FIG. 25, the forward section 120 of the window opening support panel 74 is located outboard of the reinforcing panel 70 and is dimensioned and shaped to overlay most of the reinforcing panel 70. As is also shown in FIG. 25, the main panel portion 130 of the window opening support panel 74 is attached and the reinforcing panel 70 via rivets (not shown). Hence, a non-edge portion of the window opening support panel 74 is fixed to a non-edge portion of the reinforcing panel 70.

As shown in FIG. 11, the rear end 136 of the window opening support panel 74 is attached to a rear portion of the inner door panel 20 adjacent to the rear peripheral portion 38 via rivets $R_3$.

During the assembly of the reinforcement assembly 30, the following connections are made between the window opening support panel 74 and the reinforcing panel 70.

Further, the window opening support panel 74 overlays contacts and is attached to the rearward flange 106 of the reinforcing panel 70 by welding or rivets (not shown). As noted above, when the reinforcement assembly 30 is installed to the inner door panel 20 and the support bracket 26, the forward flanges 102 of the reinforcing panel 70 are fixed to the support bracket 26

Further, as shown in FIG. 9, the main section 100 of the reinforcing panel 70 and the forward section 120 of the window opening support panel 74 are fixed to one another by a rivet (not shown) or welding.

As shown in FIG. 9, the inner door panel 20 is fixed to the lower flange 124 of the window opening support panel 74 via a rivet (not shown) or welding techniques thereby attaching a front lower portion of the reinforcement assembly 30 to the inner door panel 20.

Figure 28:
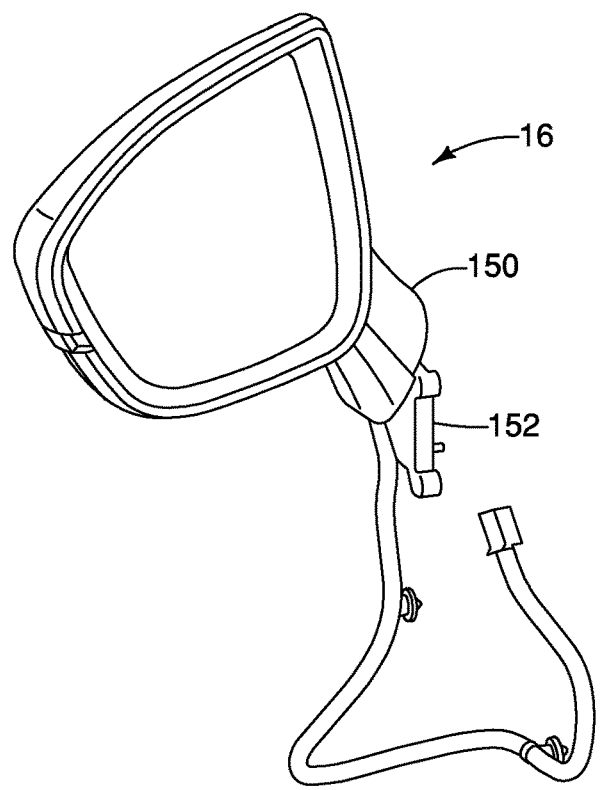
FIG. 28 is a perspective view of the side mirror assembly removed from the vehicle door assembly in accordance with the exemplary embodiment.
Figure 29:
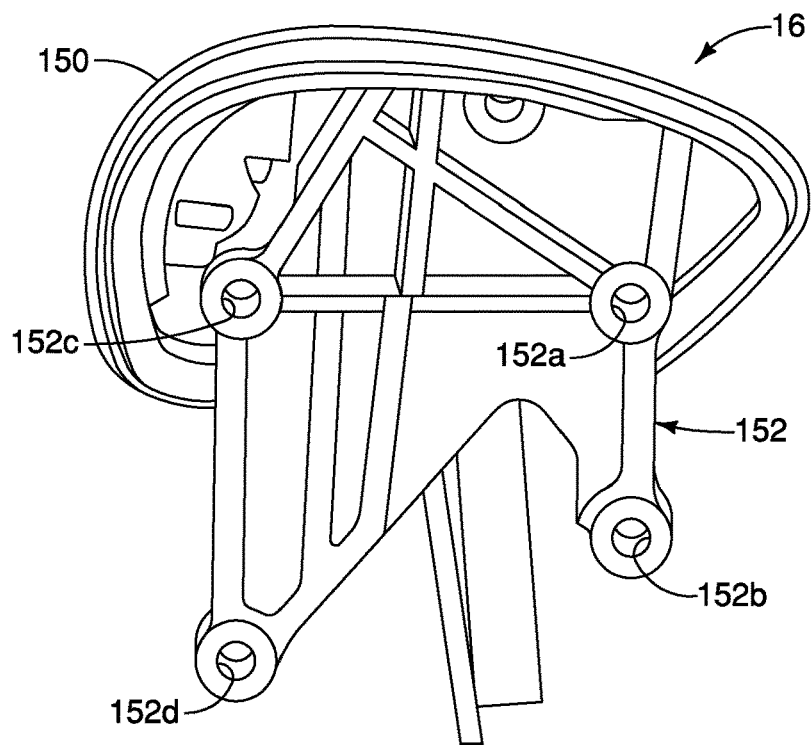
FIG. 29 is an end view of an inboard side of the side mirror assembly showing an attachment flange and fastener receiving openings in accordance with the exemplary embodiment.

As shown in FIGS. 5, 28 and 29, the side mirror assembly 16 is a conventional mirror that has a base 150 (also referred to as a housing 150) with an attachment flange 152. When the mirror assembly 16 is attached to the door assembly 14, the attachment flange 152 is inserted into an opening (not shown) in the outer door panel 32. The attachment flange 152 includes four openings 152a, 152b, 152c and 152d.

Figure 26:
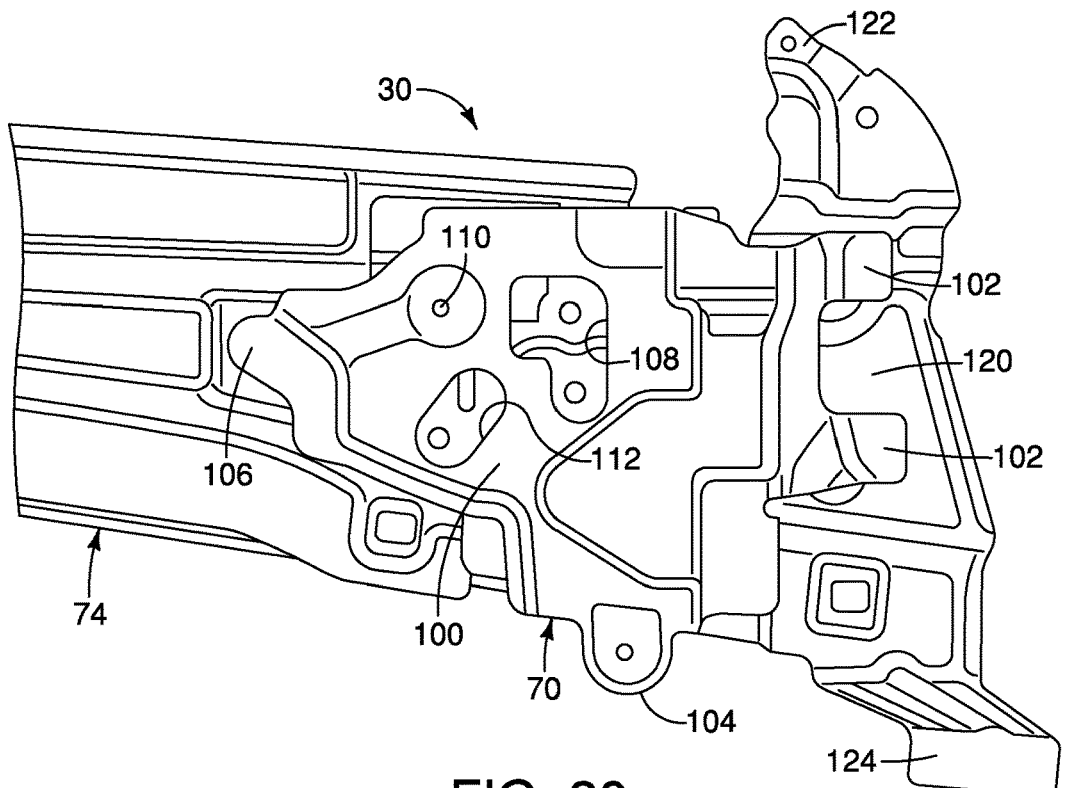
FIG. 26 is a side view of the reinforcement assembly removed from the inner door panel showing an inboard side of the reinforcement assembly in accordance with the exemplary embodiment.

The fasteners $F_3$ depicted in FIG. 5 are used to install the mirror assembly 16 to the door assembly 14. A first one of the fasteners $F_3$ is installed through the slot 59 (FIG. 6) in the inner door panel 20, through an upper one of the openings 60 in the support bracket 26 (FIG. 27), then through an upper portion of the slot 108 in the reinforcing bracket 70 (FIG. 26), through the opening 140a in the window opening support panel 74 and finally into the threaded opening 152a in the attachment flange 152 of the mirror assembly 16.

The slot 59, the openings 60 and the slot 108 are all larger than the head of the fasteners $F_3$. However, the opening 140a in the window opening support panel 74 is only dimensioned to allow a threaded portion of the fasteners $F_3$ to extend therethrough. Therefore, when the first of the fasteners $F_3$ is tightened, that portion of the attachment flange 152 is now supported and attached to the window opening support panel 74.

A second one of the fasteners $F_3$ is installed through a lower portion of the slot 59 in the inner door panel 20, through a lower one of the openings 60 in the support bracket 26, then through a lower portion of the slot 108 in the reinforcing bracket 70, through the opening 140b in the window opening support panel 74 and finally into the threaded opening 152b in the attachment flange 152 of the mirror assembly 16. The slot 59, the openings 60 and the slot 108 are all larger than the head of the fasteners $F_3$. However, the opening 140b in the window opening support panel 74 is only dimensioned to allow a threaded portion of the fasteners $F_3$ to extend therethrough. Therefore, when the second of the fasteners $F_3$ is tightened, that portion of the attachment flange 152 is now also supported and attached to the window opening support panel 74.

A third one of the fasteners $F_3$ is installed through the upper one of the openings 59a in the inner door panel 20, through the opening 110 in the reinforcing bracket 70, through the opening 140c in the window opening support panel 74 and finally into the threaded opening 152c in the attachment flange 152 of the mirror assembly 16. The opening 59a is larger than the head of the fasteners $F_3$. However, the opening 110 in the reinforcing bracket 70 and the opening 140c in the window opening support panel 74 are only dimensioned to allow a threaded portion of the fasteners $F_3$ to extend therethrough. Therefore, when the third of the fasteners $F_3$ is tightened, that portion of the attachment flange 152 is now supported and attached to both the reinforcing bracket 70 and the window opening support panel 74.

The fourth and final one of the fasteners $F_3$ is installed through the lower one of the openings 59a in the inner door panel 20, through the slot 112 in the reinforcing bracket 70, through the opening 140d in the window opening support panel 74 and finally into the threaded opening 152d in the attachment flange 152 of the mirror assembly 16. The opening 59a and the slot 112 are larger than the head of the fasteners $F_3$. However, the opening 140d in the window opening support panel 74 is only dimensioned to allow a threaded portion of the fasteners $F_3$ to extend therethrough. Therefore, when the fourth one of the fasteners $F_3$ is tightened, that portion of the attachment flange 152 is now supported and attached to the window opening support panel 74.

It should be understood from the above description that with the reinforcement assembly 30 attached properly to the inner door panel 20, the slot 59 in the inner door panel 20, the upper one of the openings 60 in the support bracket 26, the upper portion of the slot 108 in the reinforcing bracket 70 and the opening 140a in the window opening support panel 74 are all aligned with the threaded opening 152a in the attachment flange 152 of the mirror assembly 16. Similarly, the slot 59 in the inner door panel 20, the lower one of the openings 60 in the support bracket 26, the lower portion of the slot 108 in the reinforcing bracket 70 and the opening 140b in the window opening support panel 74 are all aligned with the threaded opening 152b in the attachment flange 152 of the mirror assembly 16.

As well, the upper one of the openings 59a in the inner door panel 20, the opening 110 in the reinforcing bracket 70, the opening 140c in the window opening support panel 74 and the threaded opening 152c in the attachment flange 152 of the mirror assembly 16 are all aligned. Further, the lower one of the openings 59a in the inner door panel 20, the slot 112 in the reinforcing bracket 70 and the opening 140d in the window opening support panel 74 are all aligned with the threaded opening 152d in the attachment flange 152 of the mirror assembly 16.

The above-described panels and elements of the door assembly 14 can all be made of aluminum or a steel-based material. However, in a preferred embodiment, one or more, or all of the inner door panel 20, the support bracket 26, the reinforcing panel 70, the second support panel 72, the window opening support panel 74 and the outer door panel 32 are all made of aluminum or an aluminum alloy.

The inclusion of the reinforcing panel 70 in the above-described structure strengthens and stiffens the area of the vehicle door assembly 14 where the side mirror assembly 16 is installed reducing and/or preventing vibrations of the mirror assembly 16 when driving the vehicle 10 at high speeds.

The various vehicle body structures of the vehicle 10 (other than the vehicle door assembly 14) are conventional components that are well known in the art. Since these vehicle body structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,""portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
an inner door panel;
an outer door panel fixed to an outer periphery of the inner door panel such that the inner door panel and the outer door panel define a door cavity therebetween and a window opening above the door cavity;
a support bracket attached to a forward area of the inner door panel within the door cavity;
a reinforcing panel attached to the support bracket within the door cavity;
a window opening support panel attached to the support bracket, the reinforcing panel and the inner door panel within the door cavity, the window opening support panel having an upper flange that extends from proximate the front area of the inner door panel to proximate the rear area of the inner door panel below the window opening; and
a side view mirror having a housing and an attachment flange that extends from inside the housing and into the door cavity below the window opening, the attachment flange being attached to the window opening support panel and the reinforcing panel via mechanical fasteners such that the side view mirror housing is located along an exterior side of the outer door panel when installed, the fasteners extending through the window opening support panel and the reinforcing panel thereby attaching the side view mirror thereto.

2. The vehicle door assembly according to claim 1, wherein
the window opening support panel includes a main panel portion, a forward section and a rear end, the forward section being attached to the support bracket, the reinforcing panel and the inner door panel.

3. The vehicle door assembly according to claim 2, wherein
the forward section of the window opening support panel having an upper flange portion and a lower flange portion, the upper flange portion being attached to the support bracket and the inner door panel and the lower flange portion being attached to the inner door panel.

4. The vehicle door assembly according to claim 3, wherein
the rear end of the window opening support panel is attached to a rearward portion of the inner door panel.

5. The vehicle door assembly according to claim 2, wherein
the main panel portion of the window opening support panel having the upper flange, a ribbed section and a lower flange.

6. The vehicle door assembly according to claim 5, wherein
the upper flange of the window opening support panel at least partially defines an outboard side of a window slot that extends from the front area of the inner door panel to the rear area of the inner door panel.

7. The vehicle door assembly according to claim 6, wherein
the inner door panel includes an upper edge portion that defines an inboard side of the window slot.

8. The vehicle door assembly according to claim 5, wherein
the lower flange of the window opening support panel extends in an outboard direction from and along the main panel portion.

9. The vehicle door assembly according to claim 8, wherein
the lower flange and the main panel portion defining an obtuse angle therebetween as viewed from an end of the window opening support panel.

10. The vehicle door assembly according to claim 9, wherein
the obtuse angle is between 91 and 115 degrees.

11. The vehicle door assembly according to claim 10, wherein
the obtuse angle is between 100 and 110 degrees.

12. The vehicle door assembly according to claim 11, wherein
the obtuse angle is 105 degrees.

13. The vehicle door assembly according to claim 1, wherein
inner door panel includes main panel portion that extends the full horizontal length of the door assembly and a front peripheral portion that extends laterally in an outboard direction and defines the outer periphery of the inner door panel, such that the main panel portion and the front peripheral portion at least partially define inboard and forward boundaries of the door cavity.

14. The vehicle door assembly according to claim 13, wherein
the support bracket includes a first portion and a second portion, the first portion extending laterally in the outboard direction from the second portion and overlays an upper area of the front peripheral portion of the inner door panel, the second portion overlaying a forward upper area of the main panel portion of the inner door panel and being fixed thereto.

15. The vehicle door assembly according to claim 14, wherein
the reinforcing panel has a main section, a forward flange portion, a lower flange and a rearward flange, the forward flange being attached to the support bracket and the rearward flange being attached an inboard surface of the window opening support panel.

16. The vehicle door assembly according to claim 15, wherein
an upper edge portion of the inner door panel defines an inboard side of the window slot with the main section of the reinforcing panel being located outboard relative to the window slot.

17. A vehicle door assembly comprising:
an inner door panel that includes a main panel portion that extends the full horizontal length of the door assembly and a front peripheral portion that extends laterally in an outboard direction and defines the outer periphery of the inner door panel;
an outer door panel fixed to an outer periphery of the inner door panel such that the inner door panel and the outer door panel define a door cavity therebetween, the main panel portion and the front peripheral portion of the inner door panel at least partially defining inboard and forward boundaries of the door cavity;
a support bracket attached to a forward area of the inner door panel within the door cavity, the support bracket including a first portion and a second portion, the first portion extending laterally in the outboard direction from the second portion and overlays an upper area of the front peripheral portion of the inner door panel, the second portion overlaying a forward upper area of the main panel portion of the inner door panel and being fixed thereto;
a reinforcing panel attached to the support bracket within the door cavity, the reinforcing panel having a main section, a forward flange portion, a lower flange and a rearward flange, the forward flange being attached to the support bracket;
a window opening support panel attached to the support bracket, the reinforcing panel and the inner door panel within the door cavity, the window opening support panel is located outboard of the reinforcing panel and is dimensioned and shaped to overlay at least a portion of the reinforcing panel, and the rearward flange of the reinforcing panel being attached an inboard surface of the window opening support panel; and
a side view mirror located along an exterior side of the outer door panel, the side view mirror including at least one fastener that extends through the window opening support panel and the reinforcing panel thereby attaching the side view mirror thereto, an upper edge portion of the inner door panel defining an inboard side of the window slot with the main section of the reinforcing panel being located outboard relative to the window slot.

18. The vehicle door assembly according to claim 17, wherein
an upper edge portion of the inner door panel defines an inboard side of the window slot with the main section of the reinforcing panel being located outboard relative to the window slot.

* * * * *